United States Patent Office 3,669,679
Patented June 13, 1972

3,669,679
GREEN BEAN DECAFFEINATION EMPLOYING FLUORINATED HYDROCARBONS
Hans P. Panzer, Stamford, Conn., Robert S. Yare, New City, N.Y., and Malcolm R. Forbes, Reeds Ferry, N.H., assignors to General Foods Corporation, White Plains, N.Y.
No Drawing. Filed Apr. 24, 1970, Ser. No. 31,778
Int. Cl. A23f 1/10
U.S. Cl. 99—70
10 Claims

ABSTRACT OF THE DISCLOSURE

Decaffeination of green coffee is achieved by extraction with fluorinated hydrocarbons.

BACKGROUND OF THE INVENTION

Field of the invention

The present invention relates to decaffeinating green coffee, and more particularly pertains to decaffeinating whole or ground green coffee beans with fluorinated hydrocarbons.

Description of the prior art

In the field of decaffeination it has been the general practice to employ solvents to extract caffein from green coffee beans. Aqueous or polar systems offer significant processing advantages because of their rapid extraction of coffein from the bean. However, such systems are subject to fermentation and other chemical, thermal and biological changes which cause flavor changes when the green coffee is directly contacted by the solvent. Polar solvents also lack selectivity for caffein and remove large amounts of non-caffein solids with the caffein.

Hydrocarbon systems, particularly chlorinated hydrocarbons, have been employed for years in the commercial decaffeination of whole green coffee beans. Extraction times are longer and removal of residual solvent is difficult, but the final decaffeinated products tend to be more flavorful. A major problem with hydrocarbon extraction is removal of the solvents after extraction of the caffein. Solvent removal requires prolonged treatment of the extracted bean, generally by steam, which can give rise to thermal degradation of the coffee and the solvent. Hydrocarbon extraction of green coffee and its subsequent removal can also cause serious reductions in the amount of soluble solids available for water extraction after roasting.

A major problem with both polar and non-polar solvents is the selection of a solvent which has capacity for caffein and yet does not also extract appreciable non-caffein solids.

SUMMARY

The general purpose of this invention is to provide processes for extracting green coffee bean with fluorinated hydrocarbons. The fluorinated hydrocarbons are attractive because of their good stability and lack of odor. Their toxicity is generally equivalent to that of carbon dioxide and appreciably less hazardous than conventional solvents, such as trichloroethylene and chloroform. Because of the relatively low boiling point of fluorinated hydrocarbons, extraction of caffein and subsequent solvent removal may be done at low temperatures to minimize flavor problems in the decaffeinated coffee products.

Difluoromonochloromethane is an extremely useful and preferred fluorinated hydrocarbon for extracting caffein from green coffee. It is extremely stable, almost odorless, having a low boiling point and a toxicity rating equivalent to carbon dioxide. The solubility of caffein in difluoromonochloromethane at room temperature is equivalent to that in trichloroethylene. Its selectivity for caffein is good, with non-caffein solids extracted by the solvent being mainly oils or trace amounts of other materials; e.g., phenolics which do not contribute appreciably to the flavor characteristics of roasted, decaffeinated coffee.

An object of the present invention is to provide fluorinated hydrocarbon solvent extraction processes wherein green coffee is subjected to minimized heat treatment during decaffeination.

Another object is to provide fluorinated hydrocarbon decaffeination processes which minimize residual solvent retention in the decaffeinated products, thus minimizing toxicity hazards.

A further object is to provide green coffee extraction processes using difluoromonochloromethane.

DESCRIPTION OF THE INVENTION

In the processes of this invention, green coffee beans, either a single strain or blend, are premoistened, contacted with a fluorinated hydrocarbon solvent, stripped of solvent and dried. The beans are then roasted for use as either regular coffee or for extraction in making soluble coffee.

The fluorinated hydrocarbon solvents useful in the process of this invention are aliphatic, straight chain alkanes having one to three carbon atoms and containing at least one fluorine atom. Preferred are the methane fluorocarbons having at least one hydrogen atom. A particularly preferred solvent is difluoromonochloromethane ("Freon" 22).

Representative of the fluorinated hydrocarbon solvents of this invention are trifluoromethane,
difluoromonochloromethane,
tetrafluoromethane,
trifluoromonobromomethane,
difluorodichloromethane,
trifluoromonochloromethane,
1,1-difluoroethane,
1-chloro-1,1-difluoro-2,2,2-trifluoroethane,
hexafluoroethane,
1-chloro-1,1-difluoro-2-chloro-2,2-difluoroethane,
trichloromonofluoromethane,
dichloromonofluoromethane,
1,1-dichloro-1-fluoro-2-chloro-2,2-difluoroethane,
1,1-dichloro-1-fluoro-2,2-dichloro-2-fluoroethane,
1-bromo-1,1-difluoro-2-bromo-2,2-difluoroethane,
1-chloro-1,1-difluoroethane,
1,1,1-trichloro-2,2-difluoro-3-chloro-3,3-difluoropropane,
1-chloro-1,1-difluoro-2-chloro-2-fluoro-3,3,3-trifluoropropane, and the like.

The boiling point of the fluorinated hydrocarbons of this invention range anywhere from —128° C. to over 100° C. when measured at atmospheric pressures. It is preferred to employ those fluorinated hydrocarbons having a low boiling point. The processing techniques employed for caffein removal depend to some extent on the boiling point of the solvent. For low boilers such as tetrafluoromethane, difluoromonochloromethane and the like, it is necessary to employ pressurized extraction vessels to contain the solvent. For high boilers such as 1,1-dichloro-1-fluoro-2,2-dichloro-2-fluoroethane, pressures at atmospheric or even below atmospheric may be employed. Where desired, caffein extraction at temperatures above the solvents boiling point can be employed, as when employing difluoromonochloromethane.

Selection of a suitable solvent, in addition to considerations of its boiling point and heat stability, requires the fluorinated hydrocarbon to have had at least limited caffein solubility. Preferably, the caffein solubility of the particular fluorinated hydrocarbon employed should approach that of commercially employed chlorinated hydrocarbons, such as dichloroethane and trichloroethylene. Where caffein solubility in the solvent selected is high, smaller quantities of the solvent are employed in either batch or continuous caffein extraction of the green bean. Where it is desired to employ a solvent having limited caffein solubility such as triufloromethane, much greater quantities of solvent are necessary to accomplish the same degree of decaffeination. In general, a solvent-to-dry green coffee weight ratio range of about 2:1 to 20:1 is employed with 2.5:1 to 10:1 preferred.

Another important fluorinated hydrocarbon solvent property is its selectivity or the ratio of caffein solids to non-caffein solids removed by the solvent. Where the solvent selectivity is small, such as for dichloromonofluoromethane ("Freon" 21) the amount of non-caffein solids removed to reach a certain decaffeination of the green bean becomes large, and in many cases it is necessary to recover the non-caffein solids and add them back to the caffein extracted green bean. Where the selectivity ratio is greater and approaches that of the commercially employed decaffeination solvents, such as when using difluoromonochloromethane ("Freon" 22), it is not generally necessary to recover non-caffein solids for add-back, although this may be practiced if desired. It is preferred to employ a fluorinated hydrocarbon having high selectivity, since degradation of the green coffee solids is likely to occur during separation of these solids from the solvent and during add-back of the non-caffein solids to the decaffeinated green bean. In addition to flavor problems, add-back systems require more complicated processing equipment and hence, greater processing costs.

Another important factor in selecting a fluorinated hydrocarbon caffein solvent is the toxicity of the solvent, since commercial decaffeinated green beans retain at least trace amounts of the solvent employed to decaffeinate them. The fluorinated hydrocarbon solvents of this invention are far less toxic than commercially employed chlorinated hydrocarbons.

An extremely important factor in selection of a particular solvent or combination of fluorinated hydrocarbon solvents for caffein extraction is the ease in which residual solvent can be removed from the decaffeinated green coffee after extraction. The higher boiling fluorinated hydrocarbons (high boiler) with boiling points above 20° C. at atmospheric pressure require prolonged steaming or other art-recognized stripping processes to remove the solvent in a manner equivalent to that currently employed, after decaffeination, with commercially used trichloroethylene, dichloroethane, or other chlorinated solvents. The low boilers, boiling point of 20° C. or below, particularly those boiling below 10° C., are preferred, since excess solvent is rapidly removed without the necessity of prolonged heating or steaming. Since flavor is extremely important, this solvent removal step can be critical.

The process of this invention may be broken down into four basic steps: (1) an initial premoistening of the green bean; (2) caffein extraction by direct contact of the fluorinated hydrocarbon and green bean; (3) solvent stripping to remove residual solvent from the extracted green bean; and (4) drying for subsequent storage and roasting. When low boiling fluorinated hydrocarbons are employed, the solvent stripping and drying operations may be combined. Drying can be omitted where roasting is to be conducted in a reasonable time period after extraction.

The premoistening operation involves uniformly incorporating in the green coffee beans water, which is thought to swell the bean, solubilize the caffein and, in general, to render the green beans caffein-extractable. The type of premoistening employed will depend on the quantity of green beans to be extracted, and the type of equipment employed for premoistening. When extracting small batches of green beans, heat losses are generally high and we have found beans can be steamed within 30 minutes to yield green bean moisture contents of 40 to 50% moisture in the bean. Where large commercial batches of green beans are premoistened, longer periods of time are generally necessary. Premoistening can be accomplished by either adding water and mixing the beans, by using humidified air or other gases, or by employing steam. The particular method employed for premoistening the bean is not critical, so long as a uniform and relatively even penetration of water is obtained throughout the bean. Beans may be premoistened to any desired degree, but we have found that the greater the moisture content of the premoistened bean, the more rapid is the caffein extraction employing a given solvent. Thus, while moisture contents of about 15 to over 50% may be employed, we prefer to extract green beans having a moisture content greater than 30% water, and preferably greater than 40% water.

Extraction of the green bean can either be by batch, semi-continuous or continuous operation. The controlling factors are the desired decaffeination level, the quantity of solvent employed, the caffein solubility of the solvent, and the temperature of the solvent. Either a single fluorinated hydrocarbon or a mixture of two or more may be employed. If desired, small amounts of other solvents, such as ethanol, may be employed to improve caffein solubility. The extraction is accomplished by contacting the green bean with the fluorinated hydrocarbon solvent for a period of time sufficient to remove the desired amount of caffein. During extraction, temperatures should be maintained at low levels, and the time of extraction maintained as short as possible to reduce flavor changes in the green beans and, of course, to reduce processing costs. It is preferred to maintain the extraction solvent at a temperature from 0° C. to 100° C., which for many of the solvents employed requires superatmospheric pressure. The ratio of solvent-to-bean employed during extraction is selected to insure rapid caffein removal while maintaining the amount of solvent to be stripped of caffein, water and non-caffein solids at an economical level.

After the desired degree of extraction is achieved, the green bean is removed from the fluorinated hydrocarbon solvent, and then stripped of residual solvent clinging to the surface of the bean and present within the bean's structure. When employing high boiling fluorinated hydrocarbons, either saturated or superheated steam is employed, and stripping times to 24 hours may be required. When stripping low boiling solvents, room temperature air, vacuum, or humidified gas may be employed to remove the residual solvent, although steam may be employed if desired.

After the desired residual solvent level in the green bean has been reached, the beans are dried by any conventional means to prevent degradation during subsequent storage. The particular drying step employed should be such to minimize the heat effect on the decaffeinated moist green bean. Where low boiling fluorinated hydrocarbons are employed, the drying step may be employed to both strip the bean of residual solvent and dry.

In addition to the four basic steps employed during solvent extraction, the caffein generally removed in extraction is separated from solvent by conventional techniques, such as liquid-liquid extraction and/or evaporation and crystallization. For those solvents extracting a large amount of non-caffein solids, it is also necessary to remove these solids and add them back to the extracted green bean.

Solids present in the fluorinated solvent after extraction are recovered by evaporating the solvent to dryness and extracting the recovered solids with water. Oil and other insolubles are decanted for add-back to the decaffeinated green bean. The aqueous phase is concentrated and caffein recovered by crystallization. Alternatively, the fluorinated hydrocarbons rich in caffein may be contacted with water or other polar solvent to recover water solubles. The water phase is then contacted with a solvent specific to caffein or evaporated to recover caffein. Water insolubles are recovered from the solvent by evaporation and/or subsequent treatment with water. The exact method of treatment of the caffein rich solvent to recover caffein and non-caffein solids is not critical, provided care is taken to prevent degradation of non-caffein solids if add-back to the decaffeinated coffee is contemplated.

EXAMPLE I

Caffein solubility in various fluorinated hydrocarbons is determined by placing one gram of dehydrated caffein in 25 milliliters of solvent and heating at constant temperature (reflux where possible) for 10 minutes. The solvent is then filtered and cooled. The cooled filtrate is again filtered and the second filtrate weighed and evaporated to dryness. Caffein solubility is reported in grams/100 gms. of solvent. Typical caffein solubilities for some of the solvents of this invention are:

| Formula | Freon | Caffein solubility g./100 gms. solvent | Temp., °C. | Boiling point, °C. |
| --- | --- | --- | --- | --- |
| $CHF_3$ | 23 | 0.12 | 24 | −82 |
| $CHClF_2$ | 22 | 0.933 | 54 | −41 |
| $CHCl_2F$ | 21 | >4.0 | 54 | 9 |
| $CCl_2F_2$ | 12 | <5 mg./100 | 54 | −30 |
| $CH_3-CHF_2$ | 152A | .016 | R T | −25 |
| $CBrF_2-CBrF_2$ | 114B$_2$ | 0.128/0.22 | 26/47 | 47 |
| $CClF_2-CClF_2$ | 114 | 0.023 | 55 | 4 |
| $CCl_2F-CClF_2$ | 113 | 0.028/0.036 | 26/48 | 48 |
| $CCl_3CF_2CF_3$ | 215 | 0.028/0.14 | 20/74 | 74 |
| $CClF_2-CClF-CF_3$ | 216 | 0.024/0.13 | 20/35 | 35 |
| $CCl_3-CF_2-CF_2Cl$ | 214 | 0.080/0.39 | 20/100 | 3.6 |

The preceding caffein solubilities indicate that the methane fluorinated hydrocarbons, particularly those containing a hydrogen atom, are good caffein solvents with the solubility of caffein increasing with decreasing fluorine content. Selection of a solvent made simply on the basis of caffein solubility would lead to the use of dichloromonofluoromethane as the preferred solvent. However, experience has shown that the selectivity of this solvent is relatively poor, for as caffein solubility increases, the solubility of non-caffein solids generally increases. Difluoromonochloromethane ("Freon" 22), while having a lower caffein solubility, is a preferred solvent because its selectivity is about 0.3 to 0.5, indicating that one or two pounds of non-caffein solids are removed with each one pound of caffein. While this selectivity is lower than the commercially employed chlorinated hydrocarbons, it does not represent an appreciable handicap, since the caffein content of green bean rarely exceeds 2% by weight.

EXAMPLE II

To 300 g. of green coffee, having 9.6 g. water and 1.6 g. caffein per 100 g. of beam, is added 50 g. of water. The beans are stirred for one-half hour at room temperature until the water is uniformly incorporated in the beans. To 100 g. of the moisturized beans, containing 45% water, is added 300 ml. of difluoromonochloromethane in a Paar bomb. The bomb is sealed and placed in a hot water bath at 54° C., and held for a period of 6 hours. The Paar bomb is removed, cooled, the pressure within the bomb released, the bomb is opened, and the beans removed. Caffein analysis indicated a 29.6% removal of the total caffein in the beans.

The experiment is repeated employing beans premoistened to 20% water. The caffein removal after 6 hours at 54° C. is 19.7% of the caffein present in the green bean.

These results demonstrate the appreciable effect of moisture content on the extraction of caffein from green beans employing fluorinated hydrocarbons.

Further decaffeination is obtained by repeating the above batch extractions until the desired level of caffein has been removed.

The decaffeinated green beans are dried and roasted by conventional techniques or roasted without a drying step. For prolonged storage, it is preferred to dry the beans.

EXAMPLE III

To a tube extractor is added 283 g. of premoistened, ground, green coffee having a moisture content of 27.5% water. The wall temperature of the extractor is maintained at 0° C. Two liters of dichloromonofluoromethane ("Freon" 21) are percolated up through the moistened ground coffee, and are recovered. Analysis of the coffee indicates a 44.5% extraction of caffein. The selectivity of the solvent is 0.18 g. caffein/g. non-caffein solids. The partially extracted beans are again extracted with 6 l. of fresh "Freon" at 0° C. in an equivalent manner. The caffein extraction after this step is 70.6% of the total caffein present in the beans. The selectivity or ratio of caffein to non-caffein solids is 0.23. The extracted beans are air dried at 70° C.

EXAMPLE IV

A series of one-hour batch extraction is made employing a 5-gallon, jacketed autoclave. To the autoclave is added 8 pounds 6 ounces of broken, premoistened green coffee beans containing 43% water. Difluoromonochloromethane ("Freon" 22) is transferred from a 25 pound pressure container to the autoclave. The "Freon" is preheated to 55° C. in a hot water bath prior to its addition to the autoclave. After addition, the "Freon" container is reweighed to determine the amount of "Freon" transferred. The contents of the autoclave are stirred for one hour at 80 r.p.m. with an anchor paddle. The jacket of the autoclave is heated by hot water having a temperature of 55° C. (131° F.) bringing the pressure to about 285 p.s.i. After one hour's extraction at constant temperature, the solvent in the autoclave is drawn off into a pressure container. Fresh difluoromonochloromethane is added to the autoclave and the extraction continued for one hour at the above conditions. This procedure is repeated a total of twelve times, using approximately 25 pounds of "Freon" 22 in each batch extraction. After the twelfth extraction, the solvent is drawn off, the autoclave vented and the extracted green coffee beans removed. Analysis of these beans indicates a 0.029% caffein level on a dry weight basis, which is equivalent to a 98.3% caffein removal.

The solvent is evaporated to recover 114 g. of wax and solids, and 88 g. of water. The coffee oil and solids mixture is extracted with water 6×, 1000 cc. at approximately 50° F. The extracts are combined, insolubles removed, and the water partially distilled to a volume of 500 ml. On cooling, caffein is crystallized and the liquor is vacuum evaporated to dryness. A caffein material balance indicates 93% of the theoretically available caffein recovered.

The insolubles (oils, etc.) recovered by water extraction of the coffee oil-caffein mixture are plated on the extracted coffee beans. This is accomplished by spreading the oil on the bottom of a Sigma blade mixer, adding the decaffeinated beans and blending until the beans no longer stick to the blades of the mixer.

The plated beans are vacuum dried for 6½ hours at 70° C. to a final moisture content of approximately 3.5%.

EXAMPLE V

Following the procedure of Example IV, 6 pounds of green coffee on a dry weight basis are premoistened to 43.5% water. The premoistened beans, 10 pounds, 9½ ounces, are charged to the 5 gallon autoclave and extracted 11× with approximately 32 pounds of difluoromonochloromethane per extraction. Each extraction is made for at least one hour contact time of beans and solvent at 55° C. The decaffeinated beans are removed from the autoclave after the eleventh extraction, frozen, broken into a free-flowing state, and freeze dried in a Stokes freeze dryer at a shelf temperature of 45° F. and a condenser temperature of −50° F., to a final moisture content of 9.9% water. Caffein analysis of the beans indicates a 99.5% caffein removal.

A total of 241 g. of extracted solids is recovered on evaporation of the difluoromonochloromethane from the eleven batch extractions. These solids are extracted 5× with one liter of water at 50° C. Water insolubles, including oil, are recovered and added back to the decaffeinated beans. The water extract is distilled to a volume of 500 ml. On refrigeration there is crystallized 27.7 g. of caffein. The crystallization liquor is evaporated to dryness to recover an additional 6.0 g. for a total of 33.7 g. of water soluble solids removed during extraction.

Example V is repeated. After extraction is complete, the decaffeinated beans are placed in a rotating vessel and subjected to a vacuum of 5 inches water. Steam is gently introduced into the vessel for a period of six hours while maintaining the vacuum. The beans are then removed and air dried at 70° C.

EXAMPLE VI

Two hundred grams of ground, green premoistened coffee beans having a moisture content of about 42 to 43% are placed in a glass-lined Paar bomb. The bomb is closed and connected to a solvent transfer container. About 570 g. of preheated "Freon" 22 is introduced into the Paar bomb. The transfer container is removed and the sealed bomb placed in a water bath at 50° C. for one hour. The Paar bomb is removed from the bath and is connected to a receiver. The contents of the Paar bomb are transferred to the receiver. The receiver is removed and the drained beans are washed once with 200 g. of "Freon" 22. The wash liquid is removed and the Paar bomb again charged with 270 to 280 g. of "Freon" 22, and a second extraction made as above. A total of eleven extractions are made in the same manner to obtain 95 to 99% caffein removal.

The combined extracts from the batch extractions are evaporated to dryness. The residue is transferred to a separatory funnel and treated with 100 ml. of deionized water at 45° C. The aqueous layer is separated and dried to yield crude caffein by-product.

The oil and other water insoluble materials are collected and plated on the decaffeinated beans in any suitable manner.

The ground extracted beans, after drying by conventional techniques, are pressure roasted, which is the subject matter of a separate invention described in U.S. patent application, Ser. No. 703,525, or by other recognized pressure roasting techniques. Alternatively, the ground decaffeinated beans may be roasted in conventional solid drum roasters, provided that the air quench after roasting is rapid so as to stop the reaction and maintain proper roast flavor. This is accomplished by either chilling the air used to quench the roasted beans or by immediately dumping the roasted beans from the roaster into a suitable refrigerating medium such as Dry Ice or liquid nitrogen.

Unless otherwise indicated, all percentages are calculated on a weight basis.

We claim:

1. A process for removing caffein from green coffee which comprises premoistening the green coffee, contacting the premoistened coffee with an aliphatic, straight chain alkane having one to three carbon atoms and containing at least one fluorine atom for a period of time sufficient to reach the desired degree of decaffeination, and separating the hydrocarbon and green coffee.

2. The process of claim 1 in which the green coffee is premoistened to greater than 35% water.

3. The process of claim 1 in which the separation of hydrocarbon and green coffee includes stripping residual hydrocarbon present on the coffee surface and within its structure.

4. The process of claim 1 which further includes the step of drying the green coffee.

5. The process of claim 1 in which the fluorinated hydrocarbon is a substituted methane.

6. The process of claim 5 in which the substituted methane has at least one hydrogen atom.

7. The process of claim 6 in which the substituted methane is difluoromonochloromethane.

8. The process of claim 7 in which the coffee is premoistened to greater than 35% water by weight.

9. The process of claim 8 in which the extraction is carried out under superatmospheric pressure.

10. The process of claim 9 in which the separation of hydrocarbon and green coffee includes stripping residual hydrocarbon present on the coffee surface and within its structure, and thereafter drying the coffee.

References Cited
UNITED STATES PATENTS

| | | | |
|---|---|---|---|
| 1,977,416 | 10/1934 | Wilder | 99—70 |
| 3,155,523 | 11/1964 | Reich | 99—71 |
| 2,023,333 | 12/1935 | MacLang | 99—70 |
| 2,817,588 | 12/1957 | Barch | 99—70 |
| 2,391,981 | 1/1946 | Kremers | 99—70 X |

FRANK W. LUTTER, Primary Examiner

W. L. MENTLIK, Assistant Examiner